US006202436B1

(12) United States Patent
Ishiguro et al.

(10) Patent No.: US 6,202,436 B1
(45) Date of Patent: Mar. 20, 2001

(54) ABSORPTION COOLING APPARATUS

(75) Inventors: Katsusuke Ishiguro; Akira Maruyama; Hiroshi Kamiya, all of Nagoya (JP)

(73) Assignee: Paloma Industries, Limited, Tokyo (JP)

( * ) Notice: Subject to any disclaimer, the term of this patent is extended or adjusted under 35 U.S.C. 154(b) by 0 days.

(21) Appl. No.: 09/351,289

(22) Filed: Jul. 12, 1999

(30) Foreign Application Priority Data

Jul. 15, 1998 (JP) .................................................. 10-218597

(51) Int. Cl.[7] .................................................. F25B 15/00
(52) U.S. Cl. .................................. 62/476; 62/494; 62/484
(58) Field of Search ............................... 62/484, 494, 476

(56) References Cited

U.S. PATENT DOCUMENTS

| 4,477,396 | * | 10/1984 | Wilkinson | 261/140 |
|---|---|---|---|---|
| 4,567,736 | * | 2/1986 | Van Der Sluys et al. | 62/476 |
| 4,791,790 | | 12/1988 | Tongu . | |
| 4,872,319 | | 10/1989 | Tongu . | |
| 5,499,516 | * | 3/1996 | Andersson et al. | 62/494 |
| 5,572,884 | * | 11/1996 | Christensen et al. | 62/476 |
| 5,794,456 | | 8/1998 | Ishiguro et al. . | |
| 5,857,354 | * | 1/1999 | Ishiguro | 62/476 |
| 5,875,649 | * | 8/1998 | Ishiguro et al. | 62/484 |

FOREIGN PATENT DOCUMENTS

| 1-134177 | 5/1989 | (JP) . |
|---|---|---|
| 10-26437 | 1/1998 | (JP) . |

* cited by examiner

*Primary Examiner*—William Doerrler
*Assistant Examiner*—Mark Shulman
(74) *Attorney, Agent, or Firm*—Oliff & Berridge PLC.

(57) ABSTRACT

Dual pipe unit 40 is erected vertically and comprises cold water pipe 41 serving as a passageway of cold water and surrounded by coaxial outer pipe 42. The cold water pipe consists of evaporating pipe portion 41a sealed at the bottom and inner pipe portion 41b coaxially provided in its interior. The bottom of the inner pipe portion is open near the bottom of the evaporating pipe portion whereas its top penetrating the top of the evaporating pipe portion to project into the latter is fixed thereto in a liquid-tight manner. The cold water pipe penetrates the top of the outer pipe but it is fixed to the latter in a liquid-tight manner, with its bottom end being spaced from the bottom end of the outer pipe by a specified distance. Evaporating/absorbing compartment 43 is formed between the evaporating pipe and the outer pipe. The channel of cold water through the evaporating pipe portion is narrowed and the cold water collects toward its wall surface, flowing at an increased relative velocity. This contributes to enhance the efficiency of cooling the cold water.

2 Claims, 3 Drawing Sheets

ABSORPTION COOLING APPARATUS

BACKGROUND OF THE INVENTION

The present invention relates to an absorption cooling apparatus that is used as an outdoor machine for an absorption air conditioning system and which cools the heat transfer medium used to activate the cooling operation of an indoor air conditioner. The invention particularly relates to an improvement of the mechanism for cooling the heat transfer medium.

Among the known absorption cooling apparatuses is the one shown in FIG. 3 that has an evaporating/absorbing section of dual pipe type in which a cylindrical outer pipe 1 and a coaxial evaporating pipe 2 that penetrates both the top and bottom of the outer pipe 1, with an evaporating/absorbing compartment 3 being formed between the inner peripheral surface of the outer pipe 1 and the outer peripheral surface of the evaporating pipe 2. This evaporating/absorbing section has refrigerant dispense pipes 4 that penetrate the top plate of the outer pipe 1 to project into the evaporating/absorbing compartment 3. A liquid refrigerant is dispensed through the pipes 4 onto the outer peripheral surface of the evaporating pipe 2 so that the heat of vaporization resulting from the evaporation of the liquid refrigerant cools a heat transfer medium (which is usually cold water and hereunder referred to as "cold water") that passes through the evaporating pipe 2 from top to bottom or vice versa. The evaporating/absorbing section also has absorbing liquid dispense pipes 5 that penetrate the top plate of the outer pipe 1 to project into the evaporating/absorbing compartment 3. The refrigerant vapor formed in the compartment 3 is absorbed by an absorbing liquid that is dispensed through those pipes 5 onto the inner peripheral surface of the outer pipe 1. The absorbing liquid L that has been diluted upon absorbing the refrigerant vapor collects in the bottom of the outer pipe 1, from which it is discharged to the outside.

In order to enhance the efficiency with which cold water is cooled in the evaporating/absorbing section, the velocity of the cold water flowing through the evaporating pipe 2 must be increased. The cold water flowing through the evaporating pipe 2 is cooled more efficiently in portions close to the wall surface than in the portion close to the center of the pipe. At low velocity, the cold water forms laminar flows and the stream flowing through the center of the evaporating pipe 2 does not easily mix with the stream flowing along the wall surface, thus contributing to a lowered cooling efficiency. In addition, the evaporating pipe 2 itself is cooled and the refrigerant water dispensed onto the outer peripheral surface of the evaporating pipe 2 does not easily evaporate. Hence, the cold water flowing through the evaporating pipe 2 desirably forms turbulent flows. In order to create turbulent flows, the velocity of the cold water must be increased by inserting a turbulence promoter such as a coil or reducing the diameter of the evaporating pipe 2. However, the insertion of a turbulence promoter can increase the cost and weight of the equipment. If the diameter of the evaporating pipe is reduced, a great number of such evaporating pipes must be used or their height (length) has to be increased in order to secure the necessary surface area for the evaporation of the refrigerant and this again increases the cost of the equipment.

In the conventional evaporating/absorbing section, the evaporating pipe 2 penetrates both the top and bottom of the outer pipe 1 and cold water flows either from top to bottom or vice versa. The cold water always passes through the bottom of the outer pipe 1, so without some special structural design, it may be subject to the heat of the hot absorbing liquid L collecting in the bottom of the outer pipe 1 and this will result in an even lower cooling efficiency.

SUMMARY OF THE INVENTION

The present invention has been accomplished under these circumstances and has as an object providing an absorption cooling apparatus capable of cooling cold water (heat transfer medium) in a higher efficiency.

The stated object of the present invention can be attained by the absorption cooling apparatus according to aspect 1 which comprises a vertically erected outer pipe, an evaporating pipe that penetrates the top of the outer pipe and which is coaxially provided in the interior thereof, the bottom of the evaporating pipe being sealed and spaced from the bottom of the outer pipe such that a heat transfer medium flows in or out from the top, an inner pipe that is coaxially provided in the interior of the evaporating pipe and which has the bottom thereof open in a position near the bottom of the evaporating pipe to allow the heat transfer medium from the evaporating pipe to flow in through the opening in the bottom thereof or allows the heat transfer medium to flow out through the same opening and an evaporating/absorbing compartment formed between the outer pipe and the evaporating pipe, wherein the heat transfer medium flowing through the evaporating pipe is cooled by the evaporation of a liquid refrigerant that is dispensed through the outer pipe onto the outer peripheral surface of the evaporating pipe and the resulting refrigerant vapor is absorbed by an absorbing liquid dispensed through the outer pipe onto the inner peripheral surface of the outer pipe.

The channel of the heat transfer medium flowing through the evaporating pipe is narrowed by the inner pipe provided in the interior thereof, causing the heat transfer medium to collect toward the wall surface of the pipe. As a result, the efficiency at which the heat transfer medium is cooled is substantially enhanced. The reduced cross-sectional area of the channel of the heat transfer medium through the evaporating pipe has an added advantage in that if an equal volume of cold water flows in, the relative increase in its velocity leads to a further increase in the efficiency at which the heat transfer medium is cooled. What is more, the bottom of the evaporating pipe is spaced from the bottom of the outer pipe, so unlike in the prior art absorption cooling apparatus, the evaporating pipe is immune to the effects of the hot absorbing liquid collected in the bottom of the outer pipe and the efficiency of cooling the heat transfer medium is further enhanced.

DETAILED DESCRIPTION OF THE PREFERRED EMBODIMENTS

Figure 1:
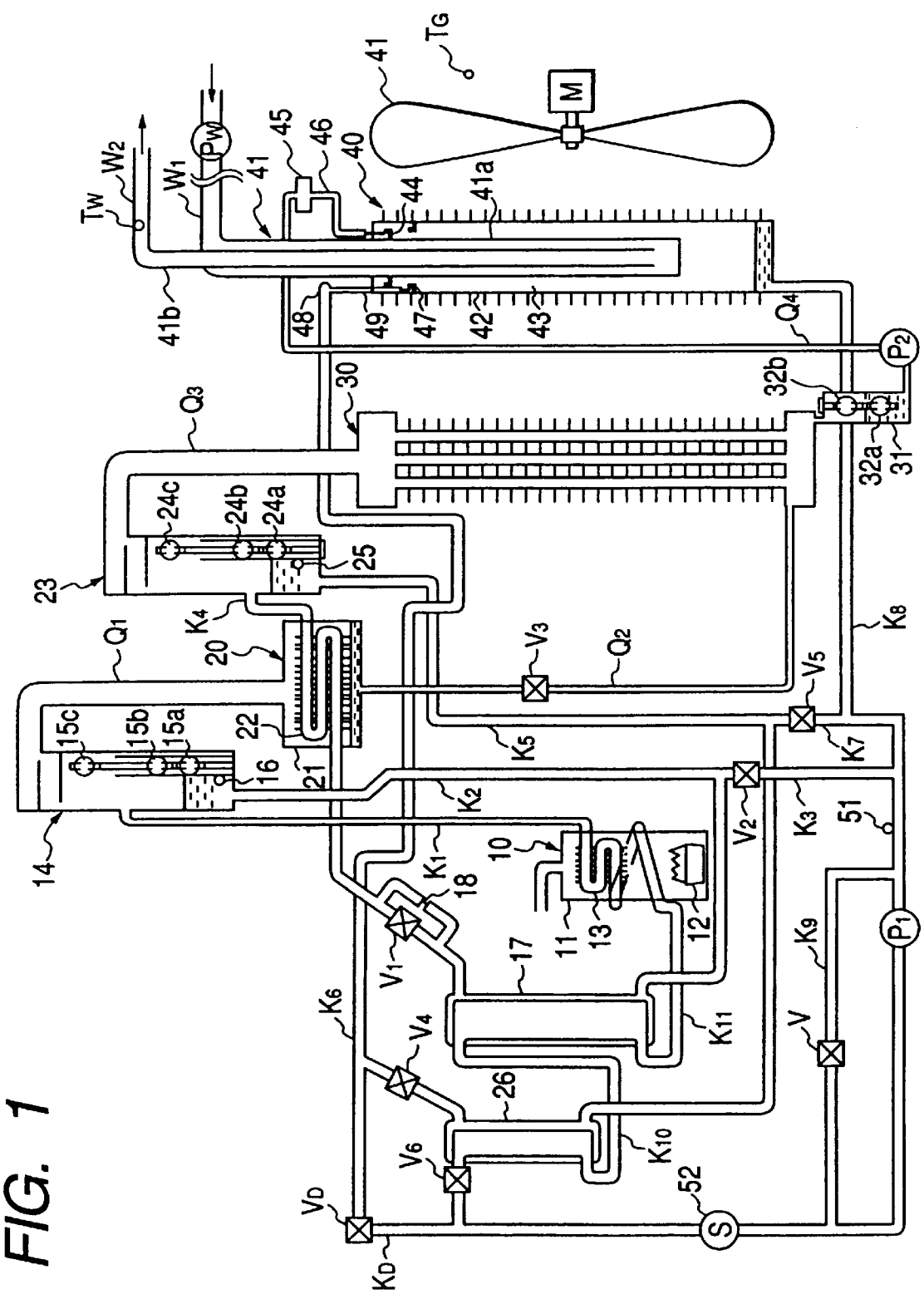
FIG. 1 is a diagrammatic representation of an absorption cooling apparatus according to an embodiment of the present invention.
Figure 2:
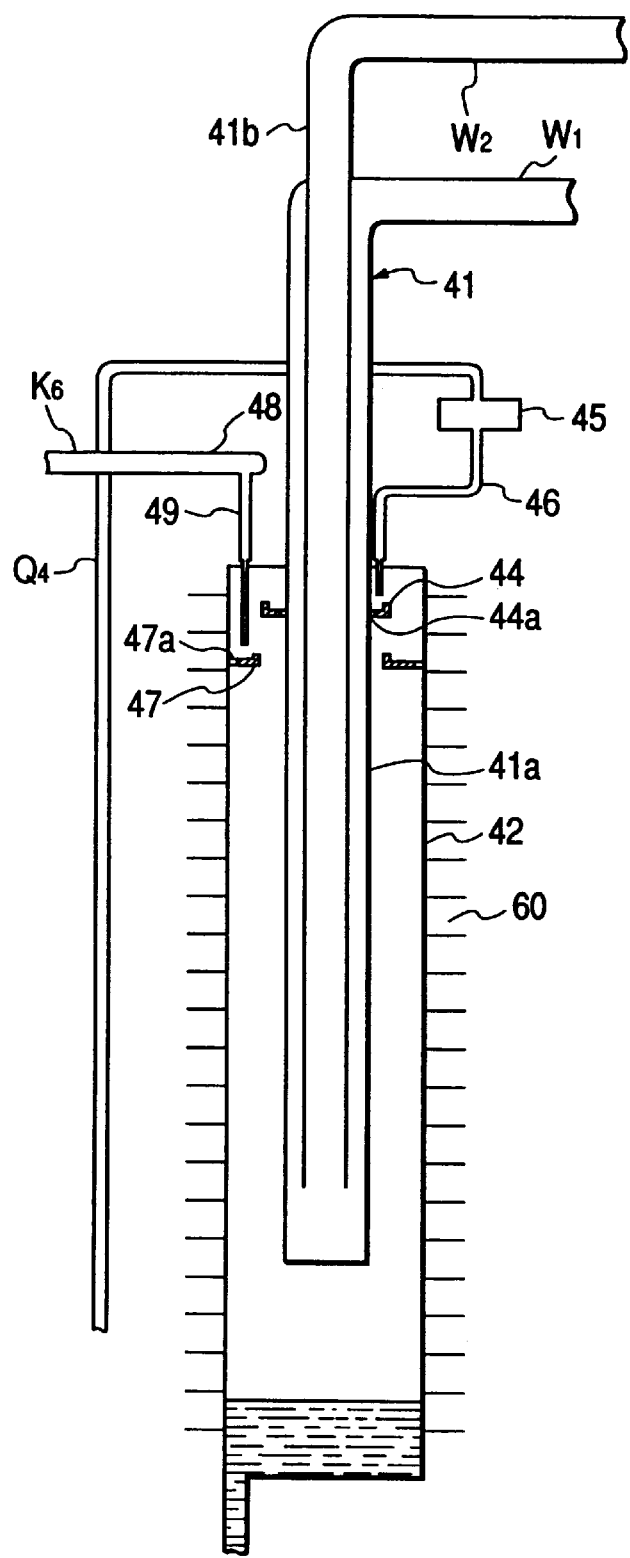
FIG. 2 is a sectional. view showing details of the dual pipe unit in the absorption cooling apparatus.
Figure 3:
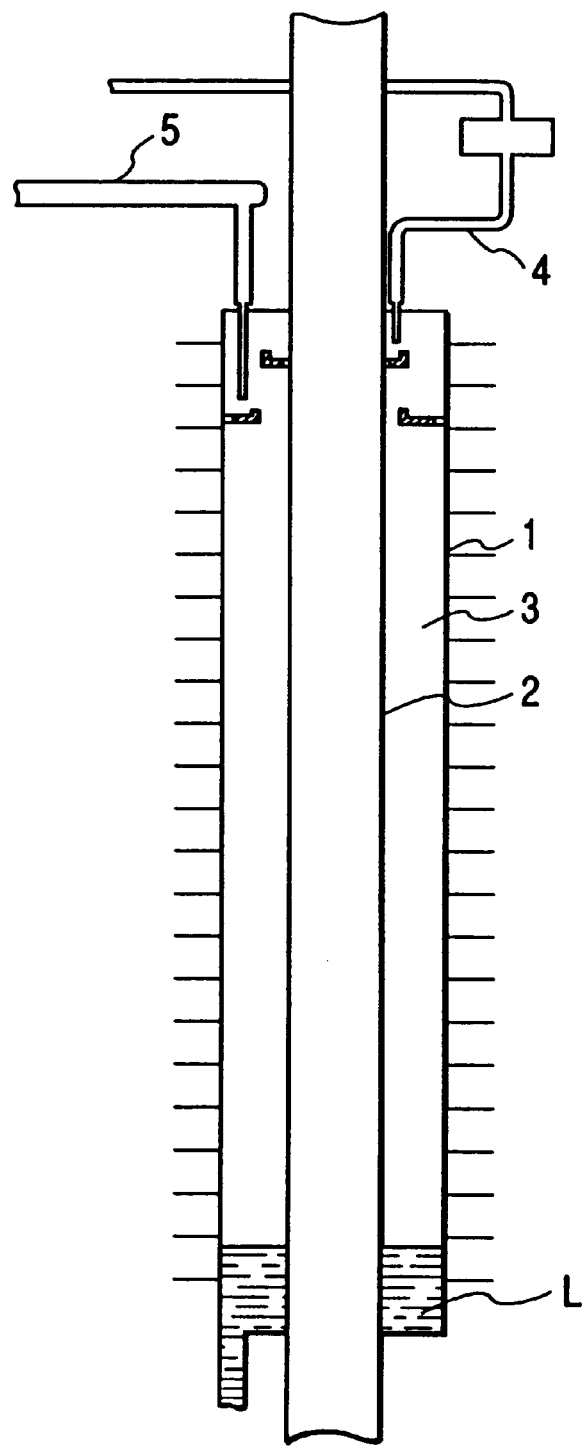
FIG. 3 is a diagrammatic representation of a prior art absorption cooling apparatus.

We now describe an embodiment of the invention with reference to accompanying drawings, among which FIG. 1 shows the general layout of an absorption cooling apparatus according to the embodiment which cools a heat transfer medium (which is cold water in the case under consideration and hereunder referred to as "cold water") used for cooling purposes in an indoor cooler.

The absorption cooling apparatus shown in FIG. 1 has the following basic elements: a high-temperature generator 10 which uses the heat of combustion from a burner 12 to heat an aqueous solution of lithium bromide (which is hereunder referred to as either a low-concentration solution, a medium-concentration solution or a high-concentration solution depending on the concentration of lithium bromide), or a low-concentration absorbing liquid; a high-temperature separator 14 for high-temperature generator (which is hereunder referred to simply as a high-temperature separator) by which the low-concentration solution heated in the high-temperature generator 10 is separated into steam and a medium-concentration solution; a low-temperature generator 20 by which the medium-concentration solution being sent from the high-temperature separator 14 via a high-temperature heat exchanger 17 is reheated with the steam sent from the high-temperature separator 14; a low-temperature separator 23 for low-temperature generator (which is hereunder referred to simply as a low-temperature separator) by which the medium-concentration solution heated in the low-temperature generator 20 is separated into steam and a high-concentration solution; a condenser 30 by which the steam being sent from the low-temperature separator 23 is cooled to liquefy; a dual pipe unit 40 which cools the cold water for cooling purposes by evaporating the refrigerant water being sent from the condenser 30 and which also allows the resulting steam to be absorbed by the high-concentration solution being sent from the low-temperature separator 23 via a low-temperature heat exchanger 26; a cooling fan 50 for cooling the dual pipe unit 40 and the condenser 30; and a solution pump P1 with which the low-concentration solution from the dual pipe unit 40 is sent to the high-temperature generator 10 after its temperature has been raised by heat exchange in the low-temperature heat exchanger 26 and the high-temperature heat exchanger 17. The individual elements are interconnected by pipes. For more specific information about the individual elements, see below.

The high-temperature generator 10 has a fin-and-tube heat exchanger 13 (which is hereunder referred to as a heat exchanger) that is contained in a housing 11 and heated with the burner 12 so that the aqueous solution of lithium bromide flowing through the tubes is efficiently heated. The high-temperature separator 14 is connected to the high-temperature generator 10 via a circulation pipe K1 and it has the following three float switches: a lower limit float switch 15a for detecting the lower limit of the liquid level; an upper limit float switch 15b for detecting the upper limit of the liquid level; and a stop float switch 15c that is provided above the upper limit float switch 15b for detecting the critical liquid level. When the stop float switch 15c turns on, the burner 12 stops heating and the cooling apparatus shuts down. Provided within the high-temperature separator 14 is a liquid temperature sensor 16 for detecting the temperature of the medium-concentration solution contained in the separator 14.

A circulation pipe K2 for circulating the solution from the high-temperature separator 14 is connected via the high-temperature heat exchanger 17 to a fin-and-tube heat exchanger 22 to be described below (which is hereunder referred to as a heat exchanger) that is provided in the low-temperature generator 20. The high-temperature heat exchanger 17 performs heat exchange between the hot medium-concentration solution from the high-temperature separator 14 that flows externally (on the drawing) and the cold low-concentration solution being supplied from the solution pump P1 that flows internally (on the drawing). An orifice 18 and a float-associated valve V1 are provided parallel to each other on the circulation pipe K2 between the high-temperature heat exchanger 17 and the low-temperature generator 20. The orifice 18 present a resistance to the solution passing through it to create a higher pressure difference across it so that the liquid level in the high-temperature separator 14 is held at a sufficient height to provide a liquid seal. The float-associated valve V1 is a solenoid valve that is operatively associated with the float switches 15a and 15b in the high-temperature separator 14 such that it is closed when the lower limit float switch 15a turns off by detecting the level of the internal medium-concentration solution having dropped to the lower limit whereas it is opened when the upper limit float switch 15b turns on by detecting the liquid level having reached the upper limit.

Provided on the circulation pipe K2 at a site upstream of the high-temperature heat exchanger 17 is an anti-overflow pipe K3 that branches from the circulation pipe K2 to combine with and connect to a circulation pipe K8 to be described below (the term "upstream" is hereunder used to describe the side from which the solution flows and the term "downstream" is used to describe the side to which the solution flows). The anti-overflow pipe K3 is provided with an overflow valve V2 that opens or closes the conduit; when the overflow valve V2 opens, the solution will no longer overflow the high-temperature separator 14.

The low-temperature generator 20 has a fin-and-tube heat exchanger 22 contained in a housing 21, to which is connected a pipe Q1 serving as a path for the steam from the high-temperature separator 14. The aqueous solution of lithium bromide flowing through the heat exchanger 22 is heated with the steam supplied from the high-temperature separator 14 via the pipe Q1. Connected to the bottom of the housing 21 is a pipe Q2 through which the water collecting within the housing 21 is sent to the bottom of the condenser 30 and which is provided with a valve V3 that works as an orifice to create a liquid seal and a pressure difference between the low-temperature generator 20 and the condenser 30.

The low-temperature separator 23 is connected via a circulation pipe K4 to a site downstream of the heat exchanger 22. The low-temperature separator 23 is also provided with a lower limit float switch 24a, an upper limit float switch 24b and a stop float switch 24c. These float switches are all used to control the liquid level in the low-temperature separator 23. It should, however, be noted that if the stop float switch 24c turns on in a non-stable state such as what occurs at start-up, a solenoid valve V5 is opened to prevent overflow. The low-temperature separator 23 is provided with a liquid temperature sensor 25 for detecting the temperature of the high-concentration solution contained in it. The solution from the low-temperature separator 23 is circulated through a circulation pipe KS and the low-temperature heat exchanger 26 and a solenoid valve V4 that opens or closes the conduit are provided in that order on the circulation pipe K5, which combines with a circulation pipe K6 at a site downstream of the solenoid valve V4 so that it eventually connects to an absorber A to be described below. The low-temperature heat exchanger 26 performs heat exchange between the hot high-concentration solution from the low-temperature separator 23 that flows externally (on the drawing) and the cold low-concentration solution being supplied from the solution pump P1 that flows internally (on the drawing).

Provided on the circulation pipe K5 at a site upstream of the low-temperature heat exchanger 26 is an anti-overflow pipe K7 that branches from the circulation pipe K5 to combine with and connect to the circulation pipe K8 to be described below. The anti-overflow pipe K7 is provided with an overflow value V5 that opens or closes the conduit; when the overflow valve V5 opens, the solution will no longer overflow the low-temperature separator 23.

The condenser 30 is formed of a plurality of vertically erected cylindrical pipes that extend through a plurality of fins. The top end of the condenser 30 is connected via a pipe Q3 to the low-temperature separator 23 so that the steam being sent from the latter is sufficiently cooled by the wind created with the cooling fan 50 to be condensed to water. The water that has liquefied in the low-temperature generator 20 flows into the condenser 30 via the pipe Q2 connected to the bottom and combines with the water condensed in the condenser 30. A refrigerant tank 31 is connected to the bottom of the condenser 30 so that the water condensed in the condenser 30 and the low-temperature generator 20 flows into the tank for temporary storage. Provided within the refrigerant tank 31 are a lower limit float switch 32a for detecting the lower limit of the liquid level and an upper limit float switch 32b for detecting the upper limit of the liquid level. A pipe Q4 extends from the bottom of the refrigerant tank 31 and connects to an evaporator E to be described below. A refrigerant pump P2 is provided on the pipe Q4 and it starts to run and supplies the liquid refrigerant when the upper limit float switch 32b turns on by detecting the liquid level of the tank 31 having reached the upper limit and stops running when the lower limit float switch 32a turns off by detecting the liquid level having dropped to the lower limit. The refrigerant pump P2 not only prevents the entrance of gases into the pipe Q4 but also controls the concentration of the absorbing liquid in the overall system.

The dual pipe unit 40 is erected vertically and comprises a cold water pipe 41 which is a circulation pipe serving as a passageway of the cold water that is to be used in an indoor cooler (not shown) and surrounded by a coaxial outer pipe 42. The cold water pipe 41 is of a dual structure consisting of the following two parts: an evaporating pipe portion 41a that is connected integrally to an inflow pipe W1 for admitting incoming cold water from the indoor cooler and which is sealed at the bottom; and an inner pipe portion 41b that is coaxially provided within the evaporating pipe portion 41a. The bottom of the inner pipe portion 41b is open near the bottom of the evaporating pipe portion 41a whereas its top penetrating the top of the evaporating pipe portion 41a to project into the latter is fixed thereto in a liquid-tight manner, with the foremost end of the inner pipe portion 41b being connected integrally to an outflow pipe.W2 for letting the cold water flow to the indoor cooler. A cold water circulating pump $P_w$ is provided on the inflow pipe W1 whereas the outflow pipe W2 is provided with a water temperature sensor $T_w$ for detecting the temperature of the cold water circulating through the pipe.

The outer pipe 42 is sealed at both top and bottom ends and has a multiple of fins 42a provided coaxially on the periphery. The cold water pipe 41 penetrates the top of the outer pipe 42 but it is fixed to the latter in a liquid-tight manner, with its bottom end being spaced from the bottom end of the outer pipe 42 by a specified distance. The bottom of the cold water pipe 41 is positioned such that it does not touch the low-concentration solution which is to collect in the bottom of the outer pipe 42. This arrangement forms the dual pipe unit 40 having an evaporating/absorbing compartment 43 that is provided between the evaporating pipe portion 41a and the outer pipe 42 and which consists of an evaporation chamber where the refrigerant water is evaporated and an absorption chamber where the evaporating refrigerant is absorbed.

The evaporating pipe portion 41a has an annular water-receiving tray 44 within the evaporating/absorbing compartment 43 near its top end in such a manner that the peripheral surface of the evaporating pipe portion 41a is surrounded with the tray. A plurality of holes 44a through which refrigerant water is dispensed onto the outer surface of the evaporating pipe portion 41a are provided in the tray 44 around its opening near the inner edge. Provided above the water-receiving tray 44 are water dispense pipes 46 that penetrate the top of the outer pipe 42 and which are distributed via a distributor 45 provided at the tip of the pipe Q4 extending from the refrigerant tank 31. The evaporating pipe portion 41a is a fluted pipe having grooves formed in the peripheral surface in both vertical and horizontal directions. This arrangement provides ease for water permeation on the peripheral surface of the evaporating pipe portion 41a so that it will drip at a slower speed to spread more easily to ensure efficient evaporation of the water flowing down the peripheral surface of the evaporating pipe portion 41a.

An annular solution-receiving tray 47 is provided on the inner peripheral surface of the outer pipe 42 in a position slightly below the water-receiving tray 44 and a plurality of holes 47a through which the solution is dispensed down the inner surface of the outer pipe 42 are provided in the tray around its opening near the outer edge. Provided above the solution-receiving tray 47 are solution dispense pipes 49 that penetrate the top of the outer pipe 42 and which are distributed via a distributor 48 provided at the tip of an extension of.the circulation pipe K6. The inner peripheral surface of the outer pipe 42 is roughened by shot blasting or other suitable technique so that the solution will easily permeate the inner peripheral surface to drip at a slower speed while spreading easily. Instead of being roughened, the inner peripheral surface of the outer pipe 42 may be fitted with a lath or other types of screen. Although not shown, there are as many dual pipe units 40 as the water dispense pipes 46 and the solution dispense pipes 49 and they are provided parallel to one another.

Extending from the bottom wall of the dual pipe unit 49 is a circulation pipe K8 that forms a solution circulating path for supplying the low-concentration solution to the high-temperature generator 10, and the pump P1 is provided midway the circulation pipe K8. The aforementioned anti-flow pipes K7 and K3 are sequentially combined with and connected to the circulation pipe K8 in positions upstream of the solution pump P1. The circulation pipe K8 has a bypass pipe K9 that bypasses the solution pump P1; a bypass valve V is provided on the bypass pipe K9 to provide for adjustment of the flow of the solution. The circulation pipe K8 is also furnished with a liquid temperature sensor 51 upstream of the solution pump P1 for detecting the temperature of the solution and this is used to control both normal operation and diluting operation of the cooling apparatus. A flow sensor 52 is provided on the circulation pipe K8 in a position downstream of the solution pump P1 so as to control the ignition of the burner 12, the amount of gas supply to the burner 12 (by adjusting the flow of the low-concentration solution) and so forth. A solenoid valve V6 for opening or closing the conduit is provided near the entrance of the low-temperature heat exchanger 26. The inner pipe of the low-temperature heat exchanger 26 and that of the high-temperature heat exchanger 17 are connected by a circulation pipe K10 and the inner pipe of the high-temperature heat exchanger 17 in turn is connected to the heat exchanger 13 in the high-temperature generator 10 by a circulation pipe K11.

Provided on the circulation pipe K8 in a position slightly upstream of the solenoid valve V6 is a diluent circulating pipe KD that branches from the circulation pipe K8 to combine with the circulation pipe K6. The diluent circulating pipe KD is fitted with a diluting valve VD that opens or closes the conduit. The diluent circulating pipe KD is useful in an operation for diluting the high-concentration solution resulting from normal operation.

The actions of the absorption cooling apparatus are electrically controlled by means of a control unit (not shown) that is composed of a microcomputer typically consisting of a CPU, ROM, RAM, timer and I/O. To be more specific, in response to the inputs from the aforementioned lower limit float switch 15a, upper limit float switch 15b, stop float switch 15c, liquid temperature sensor 16, liquid temperature sensor 25, lower limit float switch 32a, upper limit float switch 32b, liquid temperature sensor 51 and flow sensor 52, as well as an ambient temperature sensor TG for detecting the temperature of outdoor air, a water temperature sensor TW for detecting the temperature of water and a power switch SW, the control unit 60 controls the aforementioned float-associated valve V1, overflow valves V2 and V5, solenoid valves V4 and V6, diluting valve VD, solution pump P1, refrigerant pump P2, cold water circulating pump PW, burner 12 and cooling fan 50.

Having described the construction of the absorption cooling apparatus according to one embodiment, we now discuss its normal operation for cooling the cold water.

When the indoor cooler switch SW is turned on, the cold water circulating pump PW starts to supply cold water to the dual pipe unit 40. Note that the cooling apparatus does not work if the temperature of the cold water is below a preset level (which is typically 7° C.). If the temperature of the cold water exceeds the preset level, solenoid valves V4 and V6 and overflow valve V2 are opened solution pump P1 starts to run. If the flow sensor 52 detects the required flow of the solution, the burner 12 starts combustion and the low-concentration solution is heated. The cooling fan 50 also starts to run. As a result, the lithium bromide solution of low concentration being heated in the high-temperature generator 10 gives off the vapor of water so that it is separated into steam and a medium-concentration solution in the high-temperature separator 14. The solution has its temperature raised rapidly as it circulates through a short path connecting circulation pipes K1, K2, anti-overflow pipe K3, and circulation pipes K8, K10 and K11.

When the liquid temperature sensor 16 detects that the temperature of the solution in the high-temperature separator 14 has exceeded a preset level (which is typically 70° C.), the overflow valve V2 is closed and the overflow valve V5 is opened. As a result, the medium-concentration solution flowing out of the high-temperature separator 14 is cooled in the high-temperature heat exchanger 17, then heated in the heat exchanger 22 in the low-temperature generator 20 and eventually separated into steam and a high-concentration solution in the low-temperature separator 23. The solution has its temperature raised rapidly as it flows through a short path connecting circulation pipes K1, K2, K4, K5, anti-overflow pipe K7, and circulation pipes K8, K10 and K11. In the case under consideration, the lower limit float switches 15a and 15b combine with the float-associated valve V1 to control the liquid level in the high-temperature separator 14, thereby preventing the mixing of steam with the solution.

When the liquid temperature sensor 25 detects that the liquid temperature in the low-temperature separator 23 has exceeded a preset level (which is typically 70° C.), the overflow valve V5 is closed. Then, the high-concentration solution from the low-temperature separator 23 is cooled as it passes through the low-temperature heat exchanger 26; thereafter, the solution flows through the circulation pipes KS and K6, is distributed by the distributor 48 and dripped on the solution receiving tray 47 from the solution dispense pipes 49 so that it passes through the dispense holes 47a to flow down the inner surface of the outer pipe 42.

The steam flowing through the pipe Q3 from the low-temperature separator 23 is condensed to liquefy in the condenser 30 and, after being mixed with the refrigerant condensed in the low-temperature generator 20, it passes through the refrigerant tank 31 and the mixture is forced by the refrigerant pump P2 to be supplied to the distributor 45. The water distributed by the distributor 45 is dripped on the water receiving tray 44 from the water pipes 46 so that it passes through the dispense holes 44a to flow down the outer surface of the evaporating pipe portion 41a. Since the interior of the evaporating/absorbing compartment 43 is held at reduced pressure, the dripping water evaporates and the resulting heat of vaporization cools the evaporating pipe portion 41a so that the cold water flowing into the evaporating pipe portion 41a is cooled and flows through the inner pipe portion 41b to return to the indoor cooler. In the meantime, the heat of absorption resulting from the absorption of steam heats the outer pipe 42 via the high-concentration solution but the cooling fan 50 efficiently cools the heated outer pipe 42. The returned cold water allows the indoor cooler to run in a cooling mode.

The channel of the cold water flowing through the evaporating pipe portion 41a is narrowed by the inner pipe portion 41b provided in its interior, causing the cold water to collect toward its wall surface. As a result, the efficiency at which the flowing cold water is cooled is enhanced. The reduced cross-sectional area of the cold water channel in the evaporating pipe portion 41a has an added advantage in that if an equal volume of cold water flows in, the relative increase in its velocity leads to a further increase in the cooling efficiency. What is more, the bottom of the evaporating pipe portion 41a is spaced from the bottom of the outer pipe 42, so unlike in the prior art absorption cooling apparatus, the evaporating pipe portion 41a is immune to the effects of the hot absorbing liquid collected in the bottom of the outer pipe 42 and the efficiency of cooling the cold water is further enhanced. Since the cooling efficiency of the cold water pipe 41 is enhanced, it can be shortened as well as the outer pipe 42 to reduce the size of the dual pipe unit 40.

The evaporating refrigerant is efficiently absorbed by the high-concentration solution flowing down the inner surface of the outer pipe 42, whereupon the high-concentration solution is diluted to a lower concentration and discharged from the bottom of the outer pipe 42 into the circulation pipe K8. These actions are performed in succession so that the cold water circulating through the cold water pipe 41 is cooled efficiently to enable the indoor cooler to keep running in a cooling mode.

The absorption cooling apparatus is shut down if the required cooling load is lower than a preset level or by turning the power switch SW off. In either case, the gas supply channel to the burner 12 is cut off and the cooling fan 50 is turned off and, what is more, the amount in which the solution is supplied by the solution pump P1 is reduced. Thereafter, if the liquid temperature in the low-temperature separator 23 drops below a preset level, the solution pump P1 turns off. and so does the cold water circulating pump PW if there is no demand for cooling apparatus's operation, causing the absorption cooling apparatus to shut down.

It should be noted that the embodiment described above is not the sole design of the absorption cooling apparatus of the present invention and various modifications are possible without departing from the spirit and scope of the invention, as exemplified by use of sensors other than float switches for liquid level detection, omission of the low-temperature generator and the low-temperature separator, changing the construction of the dual pipe unit, and separating the evaporator from the absorber.

According to the present invention, the pipe through which the heat transfer medium flows is adapted to have a dual structure consisting of an evaporating pipe and an inner pipe and this contributes to achieve a significant improvement in the efficiency of cooling the heat transfer medium flowing through the evaporating pipe. As a result, the heights of the evaporating pipe, the inner pipe and the outer pipe can be shortened.

What is claimed is:

1. An absorption cooling apparatus comprising:

a vertically erected outer pipe;

an evaporating pipe which penetrates the top of said outer pipe and which is coaxially provided in the interior thereof, the bottom of said evaporating pipe being sealed and spaced from the bottom of said outer pipe so that a heat transfer medium flows in or out from the top;

an inner pipe which is coaxially provided in the interior of said evaporating pipe and which has the bottom thereof open in a position near the bottom of said evaporating pipe to allow the heat transfer medium from said evaporating pipe to flow in through the opening in the bottom thereof or allows the heat transfer medium to flow out through the opening; and an evaporating/absorbing compartment formed between said outer pipe and said evaporating pipe, wherein the heat transfer medium flowing through said evaporating pipe is cooled by the evaporation of a liquid refrigerant that is dispensed through said outer pipe onto the outer peripheral surface of said evaporating pipe, and the resulting refrigerant vapor is absorbed by an absorbing liquid dispensed through said outer pipe onto the inner peripheral surface of said outer pipe.

2. The cooling apparatus according to claim 1, wherein the heat transfer medium is lithium bromide.

* * * * *